(12) United States Patent
Louvat et al.

(10) Patent No.: US 11,068,018 B2
(45) Date of Patent: Jul. 20, 2021

(54) SYSTEM AND METHOD FOR POWER MANAGEMENT OF A COMPUTING SYSTEM WITH A PLURALITY OF ISLANDS

(71) Applicant: Dolphin Design, Meylan (FR)

(72) Inventors: Mathieu Louvat, Grenoble (FR); Lionel Jure, Domene (FR); Gauthier Reveret, Meylan (FR); Alexandre Charvier, Sassenage (FR)

(73) Assignee: Dolphin Design, Meylan (FR)

( * ) Notice: Subject to any disclaimer, the term of this patent is extended or adjusted under 35 U.S.C. 154(b) by 96 days.

(21) Appl. No.: 16/377,761

(22) Filed: Apr. 8, 2019

(65) Prior Publication Data

US 2019/0235567 A1    Aug. 1, 2019

Related U.S. Application Data

(63) Continuation-in-part of application No. 15/333,704, filed on Oct. 25, 2016, now Pat. No. 10,282,214.

(30) Foreign Application Priority Data

Apr. 10, 2018    (FR) ..................... 18/53101

(51) Int. Cl.

| | |
|---|---|
| *G06F 1/08* | (2006.01) |
| *G06F 1/10* | (2006.01) |
| *G06F 1/3287* | (2019.01) |
| *G06F 1/3296* | (2019.01) |
| *G06F 1/324* | (2019.01) |
| *G06F 9/445* | (2018.01) |
| *G06F 1/3206* | (2019.01) |
| *G06F 1/04* | (2006.01) |
| *G06F 1/06* | (2006.01) |

(52) U.S. Cl.
CPC ............... *G06F 1/08* (2013.01); *G06F 1/10* (2013.01); *G06F 1/324* (2013.01); *G06F 1/3287* (2013.01); *G06F 1/3296* (2013.01); *G06F 1/04* (2013.01); *G06F 1/06* (2013.01); *G06F 1/3206* (2013.01); *G06F 9/44505* (2013.01); *Y02D 10/00* (2018.01)

(58) Field of Classification Search
CPC ..... G06F 1/04; G06F 1/08; G06F 1/06; G06F 9/44505; G06F 1/10; G06F 1/3206; G06F 1/324; G06F 1/3287; G06F 1/3296; Y02D 10/00
USPC ......................... 713/100, 300, 322, 500, 501
See application file for complete search history.

(56) References Cited

U.S. PATENT DOCUMENTS

| | | | |
|---|---|---|---|
| 5,623,234 A * | 4/1997 | Shaik ........................ | G06F 1/08 327/292 |
| 7,071,738 B1 | 7/2006 | Nguyen et al. | |
| 10,282,214 B2 * | 5/2019 | Monfort ................ | G06F 1/3206 |

(Continued)

*Primary Examiner* — Ji H Bae
(74) *Attorney, Agent, or Firm* — The Noblitt Group, PLLC (57) ABSTRACT

The invention concerns a computing system comprising: an island (102) comprising a group of circuits capable of operating in one of a plurality of operating modes, the island being coupled to an island control circuit (122); and a clock generation circuit (902) supplying a further clock signal to the island control circuit (122) for controlling a change of mode of the island, the clock generation circuit (902) being configured to select one of a plurality of clock frequencies for the further clock signal, the selection being based on the change of operating mode to be applied.

12 Claims, 6 Drawing Sheets

(56) References Cited

U.S. PATENT DOCUMENTS

| | | | | |
|---|---|---|---|---|
| 2004/0100310 A1* | 5/2004 | Kurakane | ............ | G06F 1/3203 327/114 |
| 2004/0268278 A1* | 12/2004 | Hoberman | ............ | H03K 3/012 716/127 |
| 2005/0144492 A1* | 6/2005 | Yun | ............ | G06F 1/305 713/300 |
| 2005/0182983 A1* | 8/2005 | Gaskins | ............ | G06F 1/324 713/322 |
| 2006/0123368 A1* | 6/2006 | Pineda De Gyvez | .. | G06F 1/324 716/133 |
| 2006/0259800 A1* | 11/2006 | Maejima | ............ | G06F 1/3203 713/300 |
| 2008/0172565 A1* | 7/2008 | Chu | ............ | G06F 1/3287 713/300 |
| 2010/0057404 A1* | 3/2010 | Dittmann | ............ | G06F 1/3296 702/186 |
| 2010/0058078 A1* | 3/2010 | Branover | ............ | G06F 1/3246 713/300 |
| 2011/0093733 A1* | 4/2011 | Kruglick | ............ | G06F 1/3243 713/340 |
| 2012/0054511 A1* | 3/2012 | Brinks | ............ | G06F 1/26 713/310 |
| 2015/0121519 A1* | 4/2015 | Hauke | ............ | G06F 1/329 726/22 |
| 2015/0227185 A1* | 8/2015 | Pal | ............ | G06F 1/3203 713/320 |
| 2016/0321070 A1* | 11/2016 | Okazaki | ............ | G06F 1/3287 |
| 2018/0309566 A1* | 10/2018 | Buch | ............ | H04L 9/003 |

\* cited by examiner

SYSTEM AND METHOD FOR POWER MANAGEMENT OF A COMPUTING SYSTEM WITH A PLURALITY OF ISLANDS

CROSS-REFERENCE TO RELATED APPLICATIONS

This application claims priority to French patent application number FR18/53101 filed on Apr. 10, 2018; and is a continuation-in-part of U.S. patent application Ser. No. 15/333,704, filed on Oct. 25, 2016, which claims the benefit of French patent application number FR15/60630, filed Nov. 5, 2015, and incorporates the disclosure of such applications by reference. To the extent that the present disclosure conflicts with any referenced application, however, the present disclosure is to be given priority.

FIELD

The present disclosure relates to the field of systems for managing power and clock distribution in one or more integrated circuits.

BACKGROUND

For power efficiency, it has been proposed to allow certain circuit regions of an integrated circuit to operate in one of several different operating modes selected based on performance requirements at a given time. For example, a high or low supply voltage, and a high or low frequency clock signal, may be selected depending on whether the circuit region is to have high performance or low power consumption. Such circuit regions are often referred to in the art as islands.

All of the circuits of a given island are for example supplied by common resources. For example, each of the islands receive a common power supply voltage and/or reference voltage and a common clock signal. In some cases, each island has a dedicated voltage regulator for supplying its supply voltage and a dedicated clock generator for generating its clock signal. In this manner, the supply voltage and clock signal of each island can be controlled independently of the other islands.

When a given island is to change its operating mode, for example to enter a low power state, a command is for example transmitted to the island to trigger a sequence of operations for implementing the change in the operating mode. For example, these operations involve backing up certain data and powering down the various circuits of the island in a given order. The resources supplying the island, such as a voltage supply circuit and clock generator, are also controlled to bring the supply voltage and clock frequency of the island to a desired value.

The power and clock management of the islands is often performed in centralized manner, for example by an activity control unit capable of communicating with each island and its associated voltage regulator and clock generator. However, such a solution has technical drawbacks in terms of complexity and adaptability. Indeed, if a new island is to be added to a given system design, this may require substantial changes to the activity control unit in order to adapt to the new power and clock management requirements of the new island. Furthermore, providing a voltage regular and clock generator for each island leads to a high chip area being occupied by these components, and high power consumption.

There is thus a need in the art for an improved system for providing power and clock management in a computing system.

SUMMARY

It is an aim of embodiments of the present disclosure to at least partially address one or more needs in the prior art.

According to one aspect, there is provided a computing system comprising: an island comprising a group of circuits capable of operating in one of a plurality of operating modes, wherein in a first of the operating modes the circuits of the island are adapted to receive a first voltage and/or a first clock signal of a first frequency, and in a second of the operating modes the circuits of the island are adapted to receive a second voltage different from the first voltage and/or a second clock signal of a second frequency different from the first frequency, the island being coupled to an island control circuit; and a clock generation circuit supplying a further clock signal to the island control circuit for controlling a change of mode of the island, the clock generation circuit being configured to select one of a plurality of clock frequencies for the further clock signal, the selection being based on the change of operating mode to be applied.

According to one embodiment, the clock generation circuit is configured to select a first clock frequency for the further clock signal when the change of mode is of a first type, and to select a second clock frequency faster than the first clock frequency for the further clock signal when the change of mode is of a second type, the first type of change of mode being longer to implement that the second type of change of mode.

According to one embodiment, the first type of change of mode involves a change to the voltage supplied to the island by a voltage supply circuit, and the second type of change of mode does not involve a change to the voltage supplied to the island.

According to one embodiment, the clock generation circuit comprises a ring oscillator.

According to one embodiment, the clock generation circuit comprises: a frequency divider configured to divide the frequency of an oscillating signal to generate a plurality of clock signals each at a different one of said plurality of clock frequencies; and a multiplexer configured to select one of said plurality of clock signals to form said further clock signal.

According to one embodiment, the clock generation circuit further comprises a controller configured to generate a selection signal for controlling the multiplexer to select the further clock signal.

According to one embodiment, the controller is further configured to generate an enable signal for selectively activating the generation of said oscillating signal.

According to one embodiment, the computing system further comprises at least one further island each having a corresponding island control circuit, the clock generation circuit being common for all of the island control circuits.

According to one embodiment, the clock generation circuit is coupled to all of the island control circuits via a bus via which the further clock signal is transmitted.

According to one embodiment, there is provided a method of modifying an operating mode of an island of a computing system, the island comprising a group of circuits capable of operating in one of a plurality of operating modes, wherein in a first of the operating modes the circuits of the island are adapted to receive a first voltage and/or a first clock signal of a first frequency, and in a second of the operating modes the circuits of the island are adapted to receive a second voltage different from the first voltage and/or a second clock signal of a second frequency different from the first frequency, the island being coupled to an island control circuit, the method comprising: selecting one of a plurality of clock frequencies generated by a clock generation circuit, the plurality of clock frequencies being different from each other and the selection being based on the change of operating mode to be applied; and supplying a further clock signal at the selected clock frequency to the island control circuit to control the timing of the change of the operating mode of the island.

According to one embodiment, selecting the clock frequency comprises generating a plurality of clock signals each at one of the plurality of clock frequencies, and selecting one of the plurality of clock signals to form the further clock signal.

According to one embodiment, the method further comprises generating, by a controller, a selection signal for controlling the selection of the further clock signal.

According to one embodiment, the method further comprises generating by the controller an enable signal for selectively activating the generation of the oscillating signal.

According to one embodiment, the method comprises selecting a first clock frequency for the further clock signal when the change of mode is of a first type, and selecting a second clock frequency faster or slower than the first clock frequency for the further clock signal when the change of mode is of a second type, the first type of change of mode being longer or shorter to implement that the second type of change of mode.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
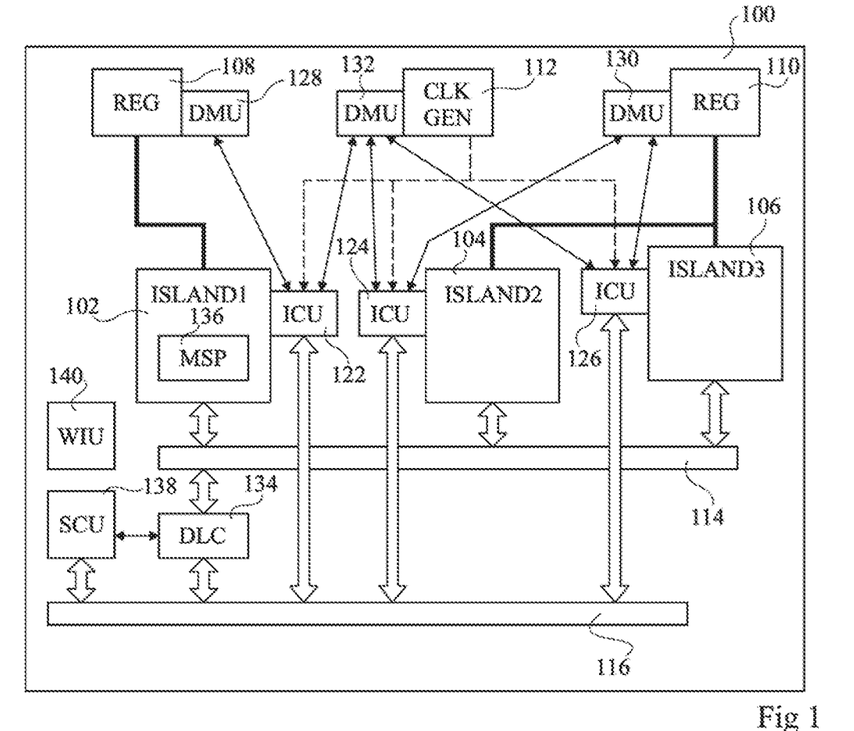
FIG. 1 schematically illustrates a computing system according to an example embodiment.

FIG. 1 schematically illustrates a computing system 100 according to an example embodiment. The computing system 100 may correspond to a system on chip (SoC), or to a plurality of integrated circuit chips. The system 100 comprises a plurality of islands. In the example of FIG. 1 there are three islands (ISLAND1, ISLAND2, ISLAND3) labelled 102, 104 and 106, but in alternative embodiments there could be any number of islands.

Each of the islands 102, 104, 106 corresponds to a group of circuits that share a common supply and/or reference voltage and/or a common clock signal. Whereas the supply voltage is a voltage used to power the island, a voltage reference is for example a voltage level used as a reference by one or more analogue circuits of the island. Although the voltage and clock supplied to the islands are common, each island for example comprises input switches permitting one or more of the signals to be independently switched off within each island.

Each of the islands 102, 104, 106 is for example capable of operating in one of a plurality of operating modes. Each operating mode for example corresponds to a particular combination of parameters relating to the supply and/or reference voltage, clock frequency and power state of the circuit. For example, one operating mode could correspond to a high-performance mode in which the supply voltage and clock frequency are at relatively high levels. Another operating mode could correspond to a low power standby mode, in which the supply voltage is at a relatively low level that is just high enough to ensure data retention, the clock signal is maintained but gated by the island, such that the island can be restarted quickly.

The computing system 100 for example comprises one or more voltage regulators (REG) for supplying the supply voltages to the islands. In the example of FIG. 1, the computing system 100 comprises two voltage regulators 108 and 110. As represented by thick solid lines, the voltage regulator 108 for example provides a supply voltage to the island 102, and the voltage regulator 110 for example provides a supply voltage to the islands 104 and 106. Each of the voltage regulators 108, 110 for example comprises one or more circuits including current and voltage sources for generating a supply voltage, and/or a power selection switch for selecting between a plurality of voltage regulators.

The computing system 100 also comprises one or more clock generators (CLK GEN). In the example of FIG. 1, the computing system 100 comprises a single clock generator 112. As represented by dashed lines in FIG. 1, the clock generator 112 for example provides a common clock signal to each of the islands 102, 104 and 106. For example, the clock generator 112 comprises one or more of: a crystal oscillator; a frequency divider; a frequency locked-loop; a phase locked-loop; a delay locked-loop; an embedded oscillator such as an RC (resistor-capacitor) oscillator; a ring oscillator; and/or other circuits capable of generating a clock signal.

While not illustrated in FIG. 1, the computing system 100 may comprise one or more further resources in addition to or instead of the voltage regulators 108, 110 and clock generator 112. For example, the computing system 100 may comprise other types of voltage supply circuit, such as a reference voltage supply circuit.

The computing system 100 for example comprises a data communications bus 114 providing a data link between the various circuits of the islands 102, 104 and 106.

In addition to the data bus 114, an island control bus 116 is also for example provided for the purposes of power and clock management. The bus 116 is for example coupled to an island control unit (ICU) associated with each island, the ICU of the islands 102, 104 and 106 being respectively labelled 122, 124 and 126 in FIG. 1. Each ICU 122, 124, 126 is for example coupled to the corresponding island 102, 104, 106, and for example supplies control signals for controlling the power and clock state of the island.

A dependency mediator unit (DMU) is for example associated with each resource, for example with each voltage regulator and each clock generator of the computing system 100 of FIG. 1. For example, the voltage regulators 108 and 110 are associated with DMUs 128 and 130 respectively, and the clock generator is associated with a DMU 132. Each of the ICUs 122, 124 and 126 is for example coupled to the DMU of the voltage regulator providing the supply voltage to its connected island, and to the DMU of the clock generator providing the clock signal to its connected island. Thus, in the example of FIG. 1, the ICU 122 of the island 102 is coupled to the DMUs 128 and 132 and the ICUs 124 and 126 of the islands 104 and 106 are each coupled to both of the DMUs 130 and 132. In the embodiment of FIG. 1, the interface between the DMUs 128, 130, 132 and the ICUs 122, 124, 126 is provided by a plurality of dedicated communication wires. However, in alternative embodiments, these communications could be made using the bus 116.

A domain link controller (DLC) 134 is for example coupled to the bus 116, and for example arbitrates between power management commands generated by a mode switching program (MSP) 136 and by a shift control unit (SCU) 138.

The MSP 136 is for example implemented in the island 102, although in alternative embodiments it could be implemented elsewhere in the computing system 100. The MSP 136 for example controls the operating modes of the islands via the bus 116. For example, the MSP 136 stores a list indicating a current power state and operating mode of each of the islands. The MSP 136 is thus capable of coordinating transitions between operating modes of the islands 102, 104 and 106. The MSP 136 is for example a program for example loaded into an instruction memory and executed by a microprocessor of the island 102 (not illustrated in FIG. 1). When the instructions of the MSP are executed by the microprocessor, they allow the functions of the MSP 136, described in more detail below, to be implemented.

The SCU 138 is for example a circuit adapted to provide power management while the MSP 136 is unable to perform this role, for example because it has been powered down. For example, the SCU controls a start-up sequence, wake-up sequence and entry into a sleep mode of the computing system 100 when the MSP is in a sleep mode or otherwise unavailable. It is also for example responsible for the start-up sequence of the MSP 136, by for example controlling the order that the various components of the MSP are turned on, and thus preventing the system from entering an undesired state from which it cannot exit.

The DLC 134 is for example adapted to receive commands from both the MSP 136 and the SCU 138. The DLC 134 for example communicates with the MSP 136 via the data bus 114, and it may communicate with the SCU 138 via a dedicated link represented in FIG. 1 by an arrow between the SCU 138 and the DLC 134, or via the bus 116. The DLC 134 for example provides an interface between the MSP 136/SCU 138 and the bus 116 by translating commands received from the MSP 136 or SCU 138 into commands that can be transmitted over the bus 116 to the ICUs using the particular bus protocol applied on the bus 116. The DLC 134 also for example translates return signals received over the bus 116 from the ICUs so that the information is accessible by the MSP 136 or SCU 138. Furthermore, the DLC 134 is for example adapted to allow the MSP 136 to control the power management network whenever it is capable of doing so, and otherwise to allow the SCU 138 to control the power management network.

A wake-up interrupt unit (WIU) 140 is for example coupled to the SCU 138, although in alternative embodiments it could be coupled to one of the ICUs 122, 124, 126. The WIU 140 is for example a circuit adapted to manage interrupts that cause one or more of the islands 102, 104, 106 to be woken. The WIU 140 for example does this by identifying the origin of each interrupt, saving each interrupt until the concerned island or islands is/are capable of handling it, and transmitting it to the concerned island or islands as soon as they have been woken and are able to process the interrupt.

In operation, the MSP 136 is for example adapted to modify the operating mode of one or more of the islands 102, 104, 106 by transmitting over the bus 116 an appropriate command to the corresponding ICU 122, 124 and/or 126, for example via the DLC 134. The ICUs receiving this command for example process it locally and determine the appropriate sequence of changes to the power state, supply voltage and/or clock signal of the connected island in order to achieve the desired operating mode change. Each ICU then transmits a request to the DMU associated with its voltage regulator and/or to the DMU associated with its clock generator, requesting the corresponding changes. If the DMU is able to make the requested changes, it for example controls the voltage regulator/clock generator accordingly, and confirms to the ICU that the request has been fulfilled. The ICU then for example informs the MSP 136 that the change has been made successfully, such that the MSP 136 can update its record of the operating mode of the corresponding ICU. In the case that the voltage regulator and/or clock generator supplies more than a single island, the DMU for example arbitrates between the requests from each of the islands, and selects or maintains the supply voltage and/or clock signal that satisfies a minimum requirement of each of the islands.

In one embodiment, each of the islands 102, 104, 106 supports at least some of the following 16 operating modes, where V is the voltage and F is the frequency:

| Mode Number | Mode Parameters | Description |
| --- | --- | --- |
| 0 | Regular V and F, ON | Normal operating mode |
| 1 | Regular V, Medium F, ON | Island functioning with medium frequency clock at regular voltage |
| 2 | Regular V, Low F ON | Island functioning with low frequency clock at regular voltage |
| 3 | Medium V and F, ON | Island functioning with medium voltage and medium frequency |
| 4 | Medium V, Low F, ON | Island functioning with medium voltage and low frequency |

-continued

| Mode Number | Mode Parameters | Description |
|---|---|---|
| 5 | Low V and F, ON | Island functioning with low voltage and low frequency |
| 6 | Regular V and F, CLK OFF | Island in standby mode |
| 7 | Medium V and F, CLK OFF | Island in standby mode with medium voltage and clock frequency |
| 8 | Low V and F, CLK OFF | Island in standby mode with low voltage and clock frequency |
| 9 | Regular V and F RETQ | Island in retention mode with quick restart, the regular voltage and frequency being maintained by the voltage regulator and clock generator |
| 10 | Medium V and F RETQ | Island in retention mode with quick restart based on medium voltage and clock frequency |
| 11 | Low V and F, RETQ | Island in retention mode with quick restart based on low voltage and clock frequency |
| 12 | Ultra-low V, CLK OFF, RETS | Island in retention mode with slow start and ultra-low voltage, the clock signal being turned off |
| 13 | Regular V and F, EXTQ | Island non-operational, with no data retention, and quick restart based on regular voltage and clock frequency |
| 14 | Medium V and F, EXTQ | Island non-operational, with no data retention, and quick restart based on medium voltage and clock frequency |
| 15 | V OFF, F OFF | Island in shut-down mode with no voltage or clock |

Of course, the above table provides just one example of a list of possible operating modes, which has the advantage that any of the operating modes can be selected using only a 4-bit command. There are however many alternative sets of operating modes that could be used, having the same or a different number of available modes.

Figure 2:
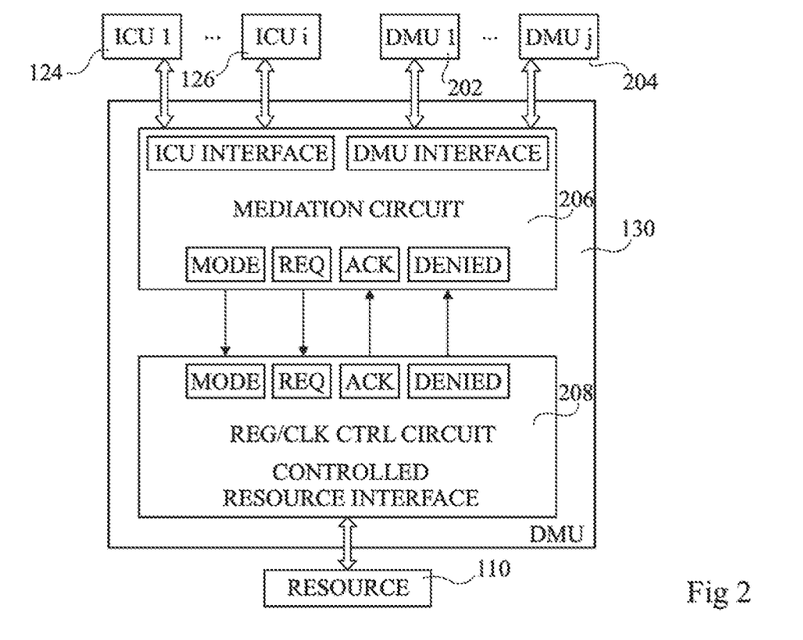
FIG. 2 schematically illustrates a dependency mediator unit of FIG. 1 in more detail according to an example embodiment.

FIG. 2 schematically illustrates the DMU 130 of FIG. 1 in more detail according to an example embodiment. The other DMUs 128 and 132 of FIG. 1 are for example implemented in a similar manner.

The DMU 130 for example comprises a mediation circuit (MEDIATION CIRCUIT) 206, which for example comprises an ICU interface (ICU INTERFACE) for communicating with one or more ICUs and a DMU interface (DMU INTERFACE) for communicating with one or more further DMUs. In the example of FIGS. 1 and 2, the DMU 130 communicates with the ICUs 124 and 126, although it could additionally communicate with further ICUs. Furthermore, in the example of FIG. 2, the DMU 130 communicates with DMUs 202 and 204.

The DMU 130 also for example comprises a control circuit (REG/CLK CTRL CIRCUIT) 208 for communicating with the mediation circuit 206 and with one or more resources (RESOURCE) such as the voltage regulator 110. For example, the mediation circuit 206 provides, to the control circuit 208, mode (MODE) and request (REQ) signals, indicating when a change of mode is desired, and receives from the control circuit 208 acknowledgement (ACK) and request denied (DENIED) signals. For example, the acknowledgement signal is asserted by the control circuit 208 when the requested mode change can be granted, whereas the request denied signal is for example asserted when a resource has not replied within a certain time, and thus the request is considered by the mediation circuit 206 to be denied.

The control circuit 208 for example comprises a resource interface (CONTROLLED RESOURCE INTERFACE) permitting it to communicate with a resource such as the voltage regulator 110.

Figure 3:
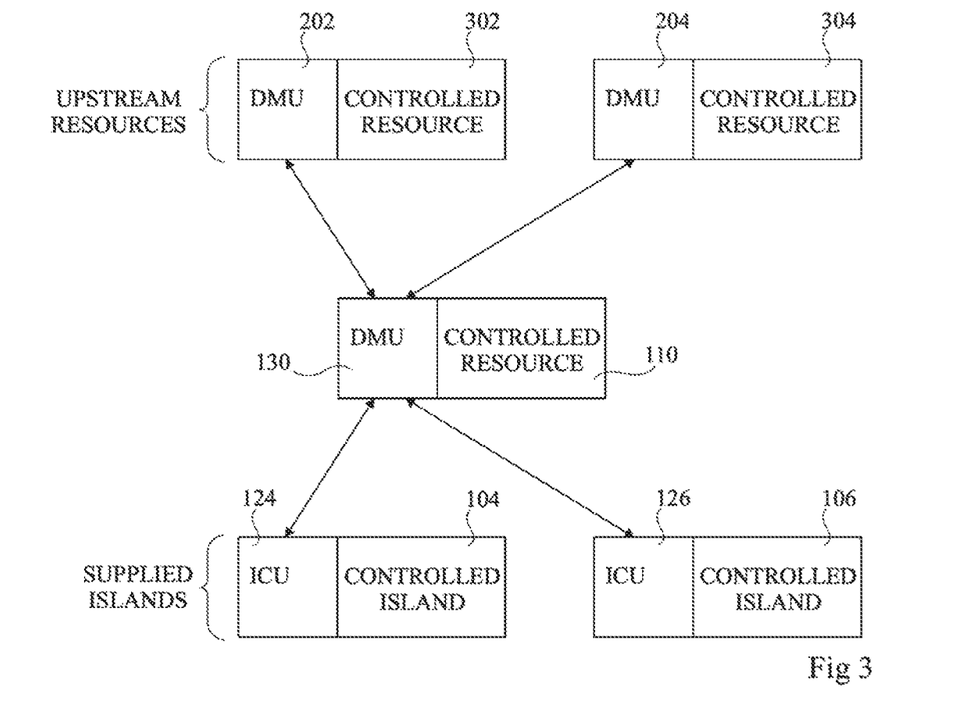
FIG. 3 schematically illustrates a voltage and clock management network according to an example embodiment of the present disclosure.

FIG. 3 schematically illustrates the voltage and clock management network associated with the DMU 130 in more detail according to an example embodiment. As described previously, the DMU 130 communicates the ICUs 124, 126 associated with its supplied islands, and with DMUs 202 and 204 associated with upstream resources. For example, the DMU 202 is associated with a controlled resource (CONTROLLED RESOURCE) 302, and the DMU 204 is associated with a controlled resource (CONTROLLED RESOURCE) 304. For example, the resources 302 and 304 each correspond to a different voltage regulator, and the resource 110 corresponds to a power selection switch that selects one of the voltage regulators 302, 304 to provide the supply voltage to the resource 110. When the DMU 130 is to implement a change of operating mode of an island, it is for example capable of requesting, via the DMU 202 or 204, that the upstream resource is controlled accordingly, for example to turn off or on the supply voltage.

Figure 4:
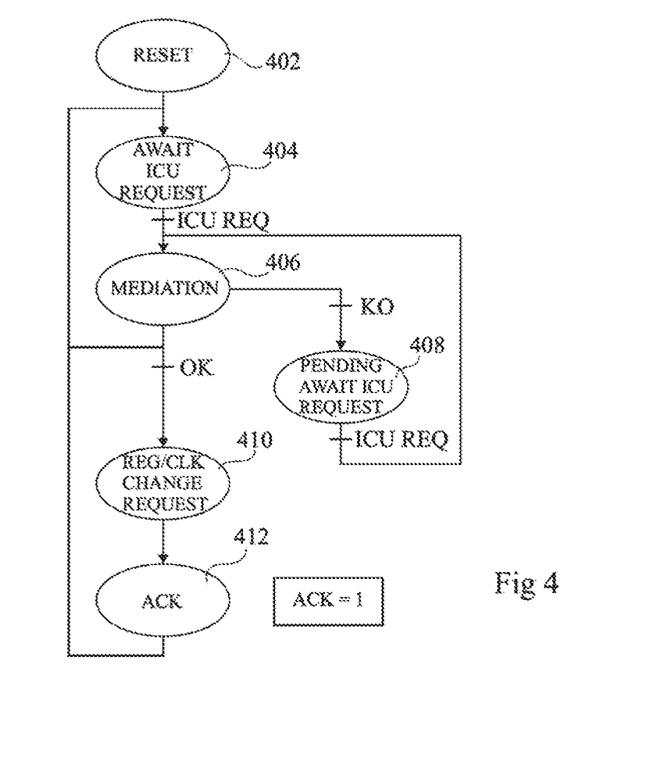
FIG. 4 is a state diagram representing the states of the dependency mediator unit of FIG. 1 according to an example embodiment.

FIG. 4 is a state diagram representing an example of the states and state transitions in each of the DMUs 128, 130, 132.

A reset state (RESET) 402 is for example entered upon power-up of the DMU, or following any reset operation.

The DMU then enters a state (AWAIT ICU REQUEST) 404, in which it is awaiting a request from an ICU.

When an ICU request arrives (ICU REQ), the DMU for example transitions to a mediation state (MEDIATION) 406. From the mediation state 406, if the requested mode is the same as or is compatible with the current mode of the resource, the acknowledgement signal is returned to the ICU by setting it to a logic 1, and the DMU then returns to the state 404. However, if in state 406 the DMU is unable to meet the requested change of mode request (KO), it for example enters a state 408, in which a denied signal is returned to the ICU, the request is indicated as pending, and it awaits a further ICU request (PENDING-AWAIT ICU REQUEST). If such a further ICU request arrives (ICU REQ), the DMU returns to the mediation state 406 to determine whether the request can now be met. If, in the mediation state 406, the DMU determines that it is able to meet one or more requested/pending mode changes (OK), it enters a change request state (REG/CLK CHANGE REQUEST) 410 in which the corresponding resource is commanded to change mode. The DMU then enters an acknowledgement state (ACK) 412, in which the acknowledgement signal returned to the ICU is for example set to a logic 1, and the DMU then returns to the state 404.

Figure 5:
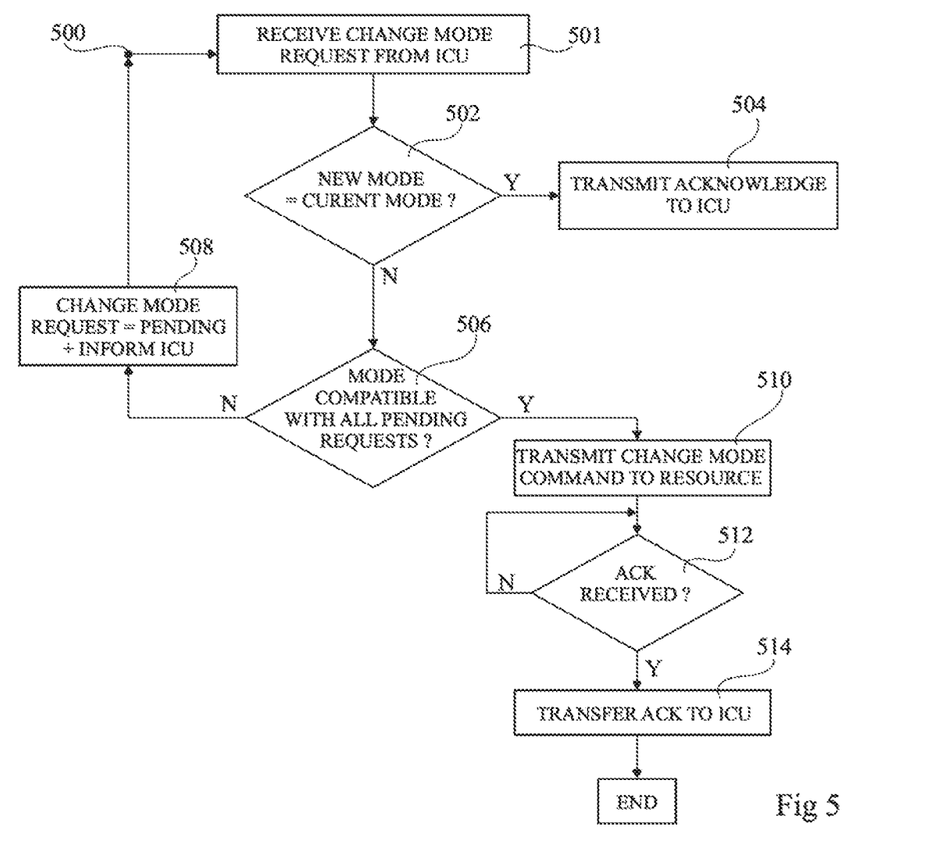
FIG. 5 is a flow diagram illustrating operations in a method of mediating between power supply and/or clock frequency change requests according to an example embodiment.

FIG. 5 is a flow diagram illustrating operations in a method of mediating between change of mode requests according to an example embodiment. These operations are for example performed by the mediation circuit 206 and the control circuit 208 of the DMU described above with reference to FIG. 2. Of course, the flow of FIG. 5 is just one example of how mediation can be implemented by the DMUs, and variations could be made to this method. It is assumed in the example of FIG. 5 that the resource controlled by the DMU supplies at least two islands, and thus the DMU is coupled to at least two corresponding ICUs.

From a start point 500, in an operation 501, a change mode request is received by the DMU from an ICU.

In a subsequent operation 502, it is for example determined whether the new mode that is requested is equal to the current mode. If so, an acknowledgement signal can be directly returned to the ICU in an operation 504. This for example occurs if another ICU has already requested the same change of state, and thus the mode has been changed. If, however, the new mode is not the same as the current mode, the next operation is 506.

In operation 506, it is determined whether the new mode that is requested is compatible with all other pending requests, in other words with the modes required by all other islands connected to the resource.

For example, assuming the resource is a voltage regulator, and its current mode based on pending requests is a low supply voltage, the new requested mode may be to increase the voltage to a medium supply voltage. Such a request is compatible with the pending requests, because the islands operating with a low supply voltage can also operate with a medium supply voltage. If however the new request is to turn off the voltage regulator, such a request is not compatible with the pending requests, which require at least the low supply voltage.

If the new mode is not compatible with all pending requests, the next operation is for example an operation 508, in which the new change mode request is marked as pending, and the ICU is informed accordingly that the change mode request has been denied.

Alternatively, if in operation 506 the new mode is compatible with all pending requests, the next operation is 510.

In operation 510, a change mode command is for example generated and transmitted to the resource under control of the DMU.

In a subsequent operation 512, it is determined whether an acknowledgement has been received from the resource, indicating that the requested change has been completed. Once the acknowledgement has been received, an operation 514 is for example performed, in which the acknowledgement is transferred to the ICU from which the change mode request originated. The method then for example ends.

Figure 6:
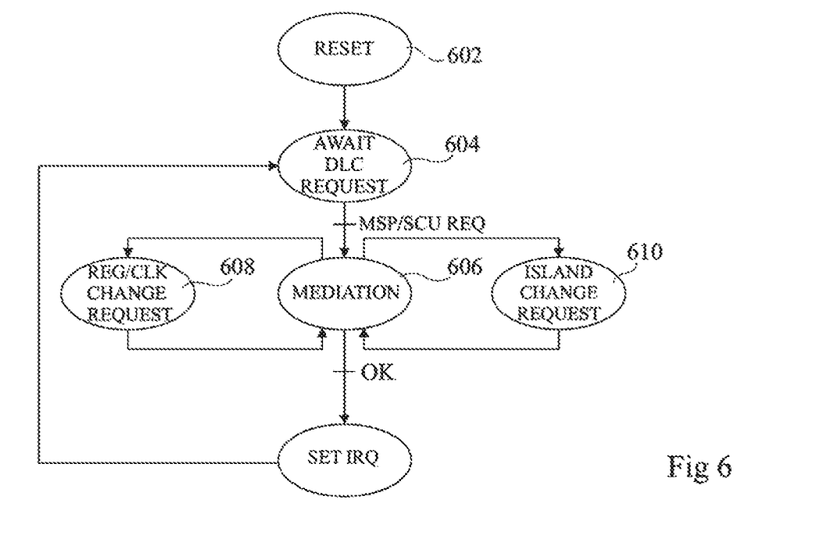
FIG. 6 is a state diagram representing states of an island control unit of FIG. 1 according to an example embodiment.

FIG. 6 is a state diagram illustrating an example of states and state transitions in each of the ICUs 122, 124, 126.

A reset state (RESET) 602 is for example entered upon power-up of the ICU, or following any reset operation.

An await DLC request state (AWAIT DLC REQUEST) 604 is then for example entered by the ICU, during which the ICU awaits a mode change request from the DLC 134, the request for example originating from the MSP 136 or from the SCU 138.

When an MSP or SCU request (MSP/SCU REQ) arrives, a mediation state (MEDIATION) 606 is for example entered. From this state, a further two states 608, 610 are entered concurrently or consecutively. The order in which the states 608, 610 are entered depends for example on the particular change of mode to be implemented.

State 608 is a regulator/clock generator change request state (REG/CLK CHANGE REQUEST) in which a request is sent to the DMU of the clock generator and/or voltage regulator of the island to change mode. The ICU awaits an acknowledgement from the relevant DMU or DMUs that the requested change has been completed. State 610 is an island change request (ISLAND CHANGE REQUEST) state, in which the island is requested to make the requested mode change. Again, the ICU for example awaits an acknowledgement from the island that the request change has been completed.

If the operations performed during each of the states 608, 610 are successful, the ICU for example returns to the mediation state 606, and it is determined that the change has been successfully completed. The ICU thus for example informs the MSP 136 or SCU 138 that the change has been completed successfully, depending on which circuit initiated the change of mode request. In some embodiments, this is achieved by setting an interrupt in the DLC 134 that can be detected by the MSP 136 or SCU 138. Thus the ICU for example moves to a set interrupt (SET IRQ) state, in which an interrupt is set, for example by asserting a bit, associated with the ICU, in a register stored by the DLC 134. This register is also accessible by the MSP 136 and SCU 138, and indicates that the mode change has terminated and that details of the change of state can be obtained from the ICU. The ICU then for example returns to state 604.

Figure 7:
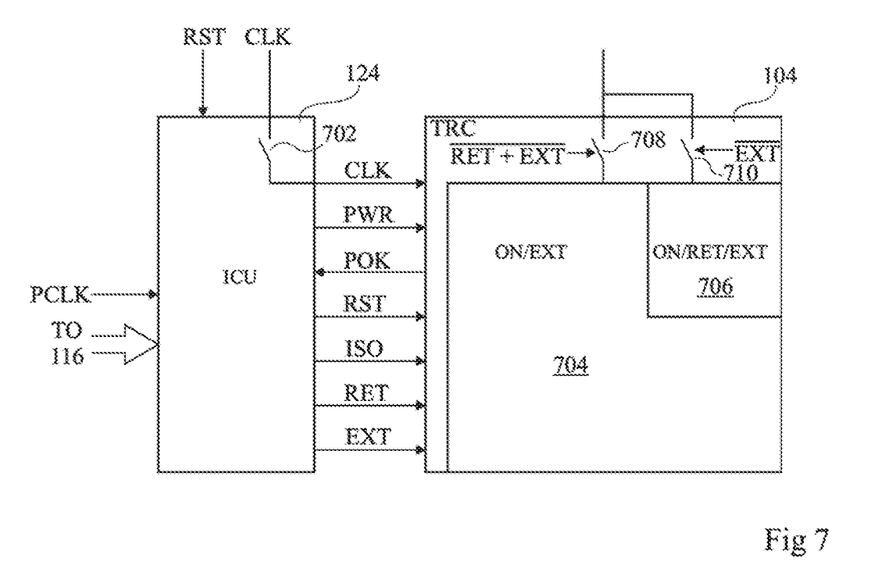
FIG. 7 schematically illustrates an interface between an island control unit and an island of FIG. 1 according to an example embodiment.

FIG. 7 schematically illustrates the interface between the ICU 124 and the island 104 according to an example embodiment. The interfaces between the other ICUs and islands of the computing system 100 are for example implemented in a similar fashion.

As illustrated, the ICU 124 for example receives the clock signal CLK from the clock generator 112, and provides this clock to island 104. The ICU 124 for example comprises a switch 702 allowing this clock to be gated. The ICU 124 also for example receives a clock signal PCLK of the bus 116, allowing data to be successfully received over the bus 116, and a reset signal RST for resetting the ICU.

The island 104 for example comprises an island controller TRC (Transition Ramp Cell), a circuit portion 704 that may be either powered on or off (ON/EXT), and a circuit portion 706 that may be powered on or off, or may enter a retention state (ON/RET/EXT). For example, the circuit portion 704 is powered by the supply voltage line of the island via a switch 708 controlled by the inverse of a signal "RET+EXT", corresponding to the inverse of the logic OR of these signals. Thus the switch 708 supplies the circuit portion 704 unless the circuit portion is to be powered-OFF (signal EXT is asserted) or to enter a low power retention mode (signal RET is asserted). The circuit portion 706 is for example powered by the supply voltage line of the island via a switch 710, controlled by the inverse of the signal EXT. Thus the switch 710 supplies the circuit portion 706 unless the circuit is to be powered-OFF (signal EXT is asserted).

The interface between the ICU 124 and the island 104 for example comprises lines for providing one or more of the following control signals:
- one or more clock signals CLK, for example comprising the main clock signal of the island provided by the clock generator 112, and in some embodiments a clock signal for the island controller TRC;
- the signal EXT mentioned above for controlling the island to power-ON or power-OFF. In some embodiments, an acknowledgement signal can be provided from the island controller TRC to the ICU indicating when the main power supply of the island via switch 708 is ready to use;
- the signal RET mentioned above controlling at least part of the island to enter a low power retention state. In some embodiments, an acknowledgement signal can be provided from the island controller TRC to the ICU indicating when the retention power supply of the island via switch 710 is ready to use;
- one or more power state signals (PWR) for controlling transitions between power states of the island. For example, these signals comprise signals for controlling the current limit and the time delay of power-ON and power-OFF sequences of the island, and retain signals for controlling retention components to retain data prior to power-OFF or restore data following power-ON;

a POK signal from the island to the ICU confirming that a change in the power state of the island has been completed;

one or more reset signals RST. For example, the reset signals may comprise a signal for resetting the island controller TRC, a signal for resetting one or more registers in the island that remain switched on during the retention mode, and a signal for resetting one or more registers in the island that are switched-off during the retention mode; and one or more isolation signals ISO for isolating one or more inputs or outputs if the island in preparation for entering a power-OFF or retention mode.

Figure 8:
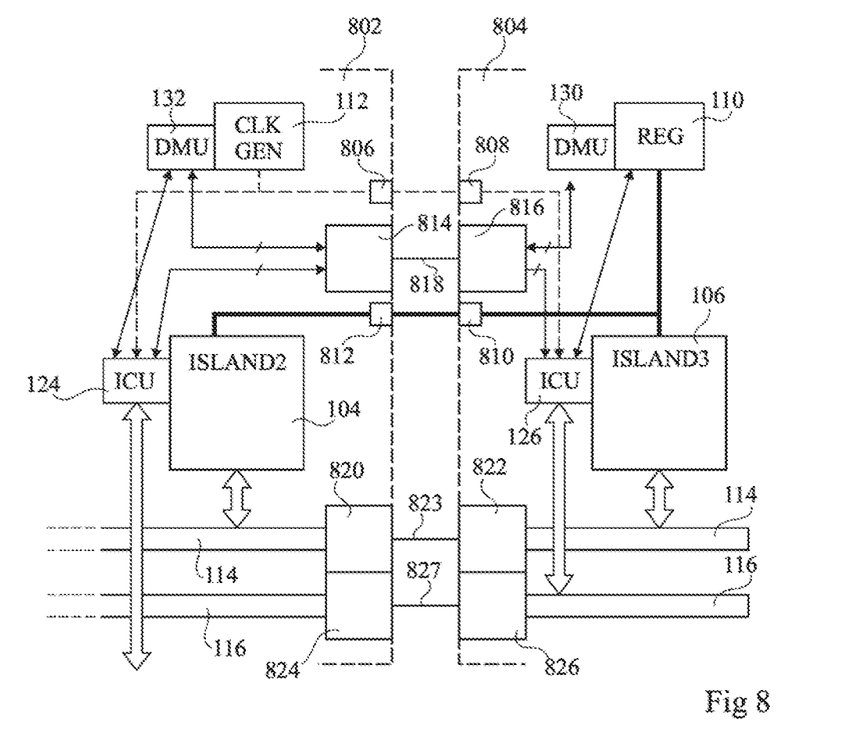
FIG. 8 schematically illustrates part of the computing system of FIG. 1 in the case that it is implemented across two integrated circuits.

FIG. 8 schematically illustrates the islands 104, 106 and resources 110, 112 of FIG. 1 in the case that the island 104 and clock generator 112 are formed on one integrated circuit (IC) 802, and the island 106 and voltage regulator 110 are formed on another integrated circuit (IC) 804. As illustrated, the clock line carrying the clock signal generated by the clock generator 112 for example passes from the IC 802 to the IC 804 via connection pads or pins 806 and 808 of the circuits 802 and 804 respectively. Similarly, the supply voltage line from the voltage regulator 110 for example passes from the IC 804 to the IC 802 via connection pads or pins 810 and 812 of the circuits 804 and 802 respectively. The communications interfaces between the ICUs and DMUs between the ICs 802, 804 are for example transferred via a serial interface between the ICs 802, 804. For example, the ICU 124 and DMU 132 of the IC 802 are both coupled by parallel interfaces with a two-way parallel/serial converter 814 of the IC 802, and the ICU 126 and DMU 130 of the IC 804 are both coupled by parallel interfaces with a two-way parallel/serial converter 816 of the IC 804. One or more serial interfaces 818 are provided between the converters 814, 816 of the ICs 802, 804.

The data bus 114 for example passes from the IC 802 to the IC 804 via two-way parallel/serial converters 820 and 822 of ICs 802 and 804 respectively and a serial connection 823 there between. Similarly, the island control bus 116 for example passes from the IC 802 to the IC 804 via two-way parallel/serial converters 824 and 826 of ICs 802 and 804 respectively and a serial connection 827 there between.

Figure 9:
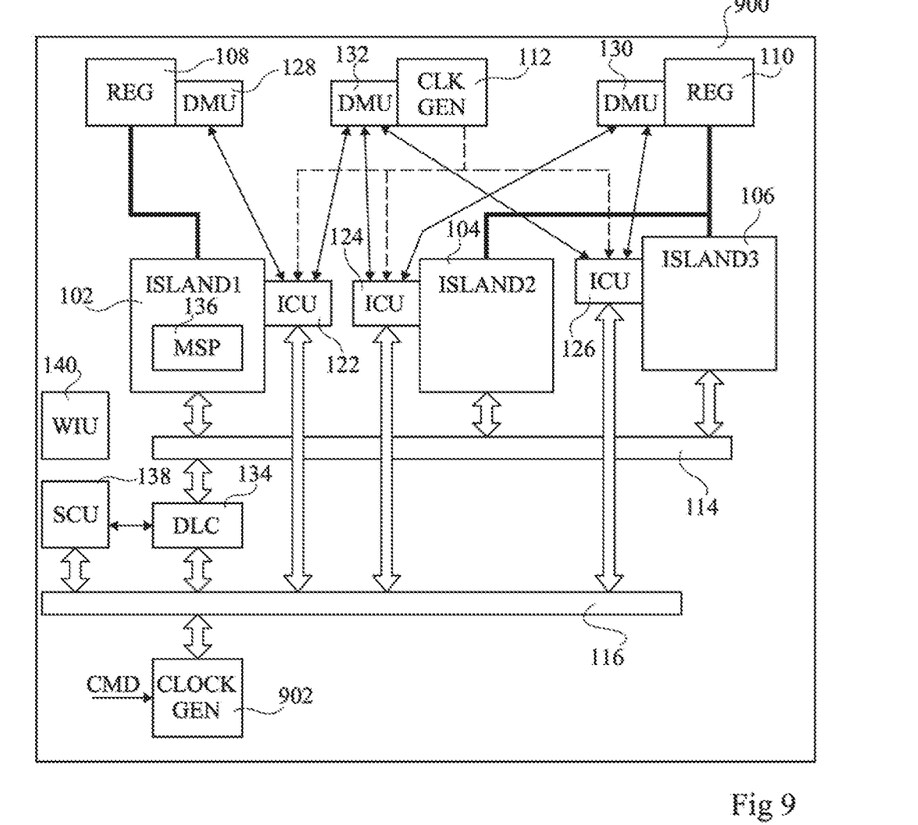
FIG. 9 schematically illustrates a computing system according to a further example embodiment of the present disclosure.

FIG. 9 schematically illustrates a computing system 900 according to a further example embodiment. The system 900 has many features in common with the system 100 of FIG. 1, and like features have been labelled with like reference numerals and will not be described again in detail.

With respect to the computing system 100, the computing system 900 for example comprises a clock generation circuit (CLOCK GEN) 902 coupled to the bus 116. The clock generation circuit 902 for example generates the clock signal PCLK that is sent over the bus 116 to each of the ICUs 122, 124 and 126 and controls the timing of each change of mode of each island. In particular, as represented in FIG. 7, the clock signal PCLK provided over the bus 116 for example clocks the ICU 124, which generates one or more of the signals PWR, RST, ISO, RET and EXT based on this clock signal. The clock generation circuit 902 is for example enabled by a command signal CMD each time a change of mode is requested by either the MSP 136 or the SCU 138.

It will be noted that the clock generation circuit 902 is an additional clock source with respect to the clock generator 112 that supplies the clock signal CLK to the islands. An advantage of providing a separate clock source is that the clock signal PCLK can be activated independently from the clock signal provided by the clock generator 112. Furthermore, the clock generation circuit 902 can generate the clock signal PCLK at a significantly lower frequency than the clock signal CLK, thereby reducing power consumption. For example, whereas the clock signal CLK generated by the clock generator 112 has a frequency in the range 100 MHz to 2 GHz, the clock signal PCLK for example has a clock frequency in the range 10 kHz to 10 MHz. The clock generator 112 can also be shut down when all of its islands are in the sleep mode, thereby reducing power consumption during the sleep mode.

As will now be described in more detail, the clock generation circuit 902 is for example capable of varying the frequency of the clock signal PCLK based on the change of mode to be applied. For example, for certain types of change of mode that do not involve a change in the supply or reference voltage supplied by the regulator 108 or 110, the circuit 902 may generate the clock signal PCLK at a relatively high frequency. For other types of change of mode that do involve a change in the supply voltage, such as a change from a low voltage to a regular voltage, the circuit 902 for example generates the clock signal PCLK to have a relatively low frequency.

As described above, in some embodiments, a change in mode can be initiated by an interrupt received by the wake-up interrupt unit 140, or by the MSP 136. When a change of mode is to be applied, the clock generator 902 for example receives a command to generate an appropriate clock signal. The command is for example generated by the MSP 136 or by the SCU 138, for example via the DLC 134.

Figure 10:
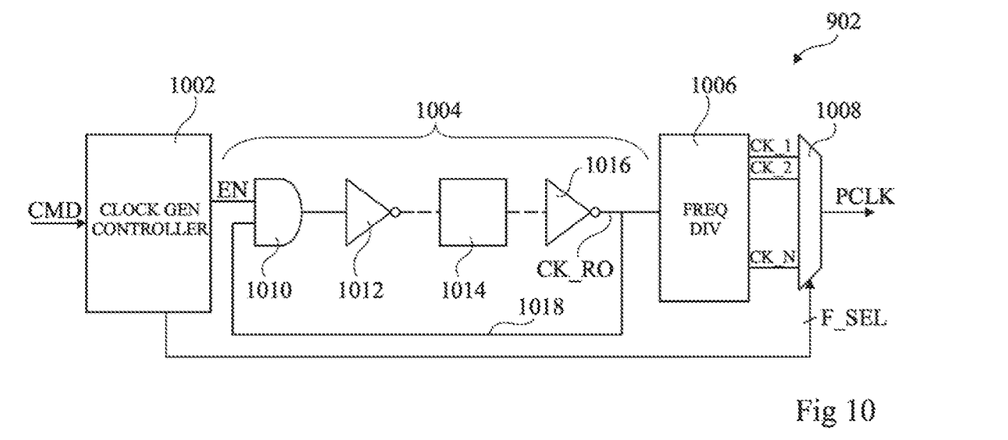
FIG. 10 schematically illustrates a clock generation circuit of the computing system of FIG. 9 in more detail according to an example embodiment.

FIG. 10 schematically illustrates the clock generation circuit 902 of the computing system of FIG. 9 in more detail according to an example embodiment.

The clock generation circuit 902 for example comprises a controller (CLOCK GEN CONTROLLER) 1002, a ring oscillator 1004, a frequency divider (FREQ DIV) 1006, and signal selection circuitry 1008.

The controller 1002 for example receives commands CMD when a change of mode is to be implemented, and generates in response an enable signal EN to activate the ring oscillator 1004 and a frequency selection signal F_SEL to the signal selection circuitry 1008 to select the clock signal at the appropriate frequency.

The ring oscillator 1004 comprises a two-input logic gate 1010, for example an AND gate, for example receiving the enable signal EN at one of its inputs, and outputting an oscillating signal to an inverter chain comprising an odd number of inverters. For example, the output of the gate 1010 is connected to the input of a first inverter 1012 of the chain. The output of the inverter 1012 is coupled via one or more further inverters 1014 to the input of a final inverter 1016 of the chain. The output of the inverter 1016 is connected to a further input of the logic gate 1010 via a feedback path 1018, and also to an input of the frequency divider 1006. The inverter 1016 provides a ring oscillator clock signal CK_RO. The number of inverters 1014 is for example configured in order to determine the oscillating frequency of the ring oscillator 1004, and thus the frequency of the signal CK_RO.

The frequency divider 1006 for example generates a plurality N of output clock signals CK_1 to CK_N by dividing the frequency of the signal CK_RO by different divisors. For example, the signal CK_1 has the same frequency F_RO as the signal CK_RO, the signal CK_2 has the frequency F_RO/2, the signal CK_3 has the frequency F_RO/4, etc.

The plurality of clock signals CK_1 to CK_N are for example provided to respective inputs of a multiplexer 1008, which is for example controlled by the selection signal F_SEL to select one of the clock signals CK_1 to CK_N to provide the output clock signal PCLK to the ICUs. As described above, the selection signal F_SEL is for example generated by the controller 1002 based on the command signal CMD.

An example of the operation of the clock generation circuit 902 will now be described with reference to FIG. 11.

Figure 11:
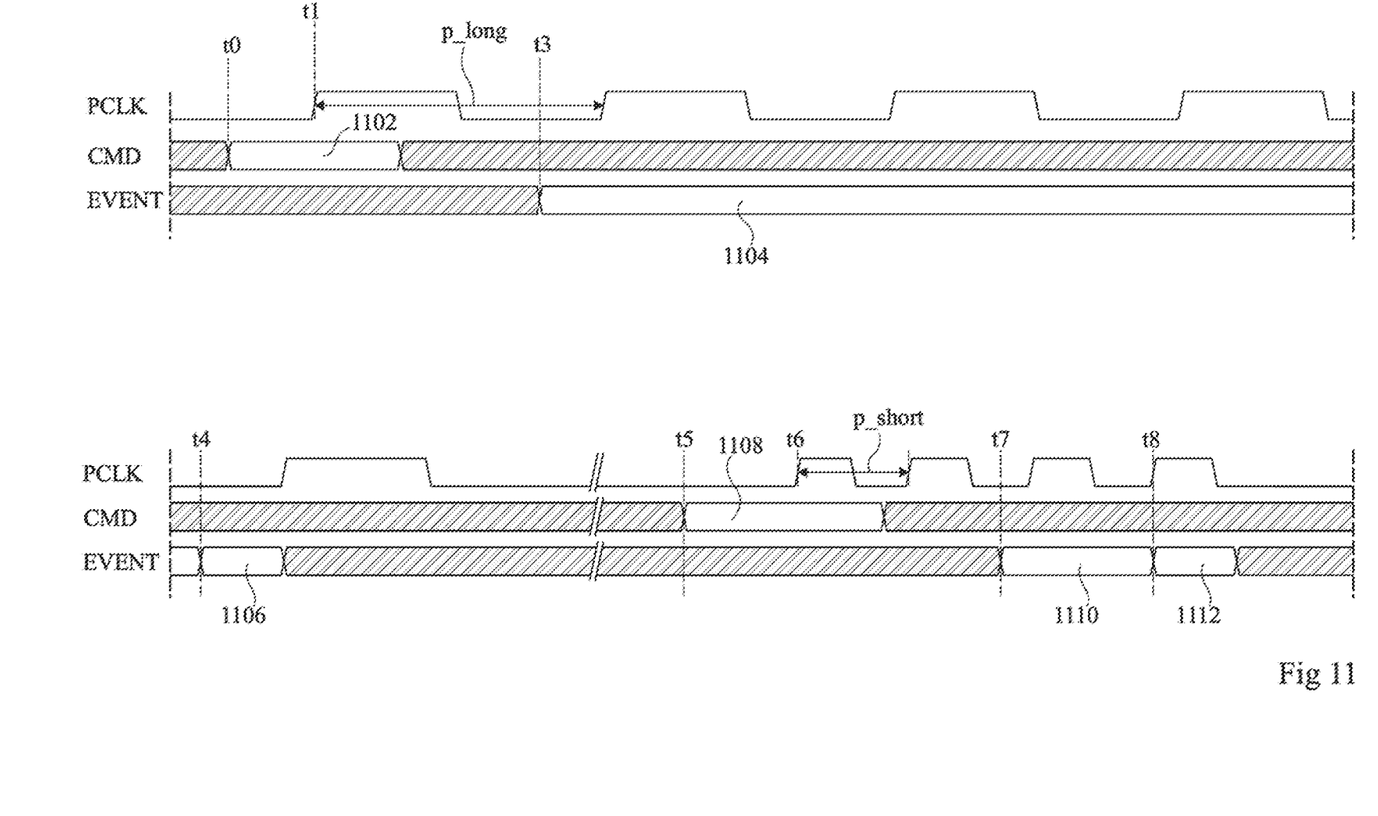
FIG. 11 is a timing diagram showing an example of signals in the system of FIG. 9.

FIG. 11 is a timing diagram showing an example of the signals PCLK and CMD in the clock generation circuit 902 of FIG. 10, and an example of events EVENT triggered by the application running on the circuit. The example of FIG. 11 is based on a first change of the circuit mode involving waking a voltage regulator and a second change of the circuit mode involving waking up an island without waking a voltage regulator.

At a time t0, a command 1102 is for example received by the controller 1002 indicating that an LDO (low drop-out) wake-up is requested for one or more islands. For example, one or more islands is to be woken involving the waking up of an LDO voltage regulator of the regulator 108 and/or 110. The controller 1002 for example asserts the enable signal EN and selects a relatively low frequency clock signal, such that at a time t1 the signal PCLK starts oscillating with a relatively long clock period p_long. The clock signal PCLK is supplied to the corresponding ICU, which in turn triggers the voltage adjustment via the DMU of the corresponding regulator.

At a time t3, the LDO wakeup sequence 1104 starts.

At a time t4 the LDO has been woken, as indicated by an event 1106, and the controller 1002 for example deactivates the enable signal EN in order to stop the clock PCLK.

It is then assumed that, at a time t5, an island wake-up command 1108 is received by the controller 1002. Thus the controller 1002 for example asserts the enable signal EN, and selects a relatively high frequency clock signal, such that at a time t6 the signal PCLK starts oscillating with a relatively short clock period p short.

At a time t7, the island wakeup sequence 1110 starts.

At a time t8, the island has been woken, as indicated by an event 1112, and the controller 1002 for example deactivates the enable signal EN in order to stop the clock PCLK.

An advantage of providing a clock generation circuit 902 configured to generate a clock signal having a frequency that depends on the change of mode to be applied is that this leads to fast operation and low power consumption. Indeed, the frequency of the clock signal PCLK can be adapted based on the change of mode to be applied, so that, for changes of mode which are intrinsically slow, such as the waking up of a voltage regulator, the frequency of the clock signal PCLK can be lowered to reduce power consumption during the changes of mode, and for changes of mode which are intrinsically fast, such as the waking up of an island, the frequency of the clock signal PCLK can be increased to speed up the duration of the change of mode. The increase in speed of a change of mode also for example permits islands to be placed in low power or retention mode more often.

A further advantage is that, by providing the clock generation circuit 902 as part of a same integrated circuit as the island control units 122, 124, 126, process, voltage and temperature variations effecting the timing of the circuit mode changes can be at least partially compensated by a corresponding change in the speed of the clock generation circuit 902, particularly in the case that the clock generation circuit 902 is implemented using a ring oscillator.

Furthermore, in between change of mode operations, the clock generation circuit can be placed in standby mode, thereby further reducing low power consumption.

An advantage of the embodiments described herein is that, by decentralizing the control of resources (voltage supply circuits and/or clock generators) to circuits associated with each island, and providing mediation by a circuit associated with each resource, the complexity of change of mode operations can be significantly reduced. This for example permits DVFS (dual voltage and frequency stepping) to be implemented to switch islands from a high power mode, in which they for example compute at full speed, to a lower power mode, in which they for example compute at a lower speed. This allows power consumption of the whole system to be adjusted dynamically at any time based on the actual requirements in terms of computing activity.

Having thus described at least one illustrative embodiment, various alterations, modifications and improvements will readily occur to those skilled in the art. For example, it will be apparent to those skilled in the art that the particular distribution of components of the computing system 100 between separate integrated circuits as shown in FIG. 8 is merely one example, and that many different configuration would be possible. For example, in some embodiments, all of the resources, and their corresponding DMUs, could be positioned on a separate integrated circuit to the islands 102, 104 and 106.

The invention claimed is:

1. A computing system comprising:
   an island (102) comprising a group of circuits capable of operating in one of a plurality of operating modes, wherein in a first of the operating modes the circuits of the island are adapted to receive a first voltage and/or a first clock signal of a first frequency, and in a second of the operating modes the circuits of the island are adapted to receive a second voltage different from the first voltage and/or a second clock signal of a second frequency different from the first frequency, the island being coupled to an island control circuit (122), the island control circuit receiving the first and/or second clock signals from a first clock generation circuit and supplying the first and/or second clock signals to the island; and
   a second clock generation circuit (902) supplying a further clock signal (PCLK) to the island control circuit (122) for controlling a change of mode of the island, the second clock generation circuit (902) being configured to:
   select one of a plurality of clock frequencies for the further clock signal (PCLK), the selection being based on the change of operating mode to be applied; and
   select a first clock frequency for the further clock signal (PCLK) when the change of mode is of a first type, and to select a second clock frequency faster than the first clock frequency for the further clock signal (PCLK) when the change of mode is of a second type, the first type of change of mode being longer to implement that the second type of change of mode.

2. The computing system of claim 1, wherein the first type of change of mode involves a change to the voltage supplied to the island by a voltage supply circuit (108, 110), and the second type of change of mode does not involve a change to the voltage supplied to the island.

3. The computing system of claim 1, wherein the second clock generation circuit (902) comprises a ring oscillator (1004).

4. The computing system of claim 1, wherein the second clock generation circuit (902) comprises:
- a frequency divider (1006) configured to divide the frequency of an oscillating signal (CK_RO) to generate a plurality of clock signals (CK_1 to CK_N) each at a different one of said plurality of clock frequencies; and
- a multiplexer (1008) configured to select one of said plurality of clock signals to form said further clock signal (PCLK).

5. The computing system of claim 4, wherein the second clock generation circuit (902) further comprises a controller (1002) configured to generate a selection signal (F_SEL) for controlling the multiplexer (1008) to select the further clock signal (PCLK).

6. The computing system of claim 5, wherein the controller (1002) is further configured to generate an enable signal (EN) for selectively activating the generation of said oscillating signal (CK_RO).

7. The computing system of claim 1, further comprising at least one further island (104, 106) each having a corresponding island control circuit (124, 126), wherein the second clock generation circuit (902) is common for all of the island control circuits (122, 124, 126).

8. The computing system of claim 7, wherein the second clock generation circuit (902) is coupled to all of the island control circuits (122, 124, 126) via a bus (116) via which the further clock signal (PCLK) is transmitted.

9. A method of modifying an operating mode of an island (102) of a computing system, the island comprising a group of circuits capable of operating in one of a plurality of operating modes, wherein in a first of the operating modes the circuits of the island are adapted to receive a first voltage and/or a first clock signal of a first frequency, and in a second of the operating modes the circuits of the island are adapted to receive a second voltage different from the first voltage and/or a second clock signal of a second frequency different from the first frequency, the island being coupled to an island control circuit (122), the island control circuit receiving the first and/or second clock signals from a first clock generation circuit and supplying the first and/or second clock signals to the island, the method comprising:
- selecting one of a plurality of clock frequencies generated by a second clock generation circuit (902), the plurality of clock frequencies being different from each other and the selection being based on the change of operating mode to be applied; and
- supplying a further clock signal (PCLK) at the selected clock frequency to the island control circuit (122) to control the timing of the change of the operating mode of the island, wherein:
  - selecting a first clock frequency for the further clock signal (PCLK) when the change of mode is of a first type; and
  - selecting a second clock frequency faster or slower than the first clock frequency for the further clock signal (PCLK) when the change of mode is of a second type, the first type of change of mode being longer or shorter to implement that the second type of change of mode.

10. The method of claim 9, wherein selecting the clock frequency comprises generating a plurality of clock signals (CK_1 to CK_N) each at one of the plurality of clock frequencies, and selecting one of the plurality of clock signals to form the further clock signal (PCLK).

11. The method of claim 10, further comprising generating, by a controller (1002), a selection signal (F_SEL) for controlling the selection of the further clock signal (PCLK).

12. The method of claim 11, further comprising generating by the controller (1002) an enable signal (EN) for selectively activating the generation of an oscillating signal (CK_RO).

* * * * *